United States Patent
Kaufmann

(10) Patent No.: US 6,301,829 B1
(45) Date of Patent: Oct. 16, 2001

(54) LANDSCAPING DRESSING AND METHOD

(76) Inventor: Eric H. Kaufmann, 27 Coventry La., Greenville, SC (US) 29609

(*) Notice: Subject to any disclaimer, the term of this patent is extended or adjusted under 35 U.S.C. 154(b) by 0 days.

(21) Appl. No.: 09/439,520

(22) Filed: Nov. 12, 1999

(51) Int. Cl.$^7$ ..................................................... A01G 7/00
(52) U.S. Cl. ..................................... 47/9; 111/102; 8/402
(58) Field of Search .................................. 47/9; 111/144, 111/102; 8/402

(56) References Cited

U.S. PATENT DOCUMENTS

| | | | |
|---|---|---|---|
| 3,812,615 | * 5/1974 | Jamison | 47/9 |
| 3,932,319 | 1/1976 | Clendinning et al. | 260/7.5 |
| 4,788,790 | 12/1988 | Zeager | 47/9 |
| 4,932,156 | 6/1990 | Underwood | 47/9 |
| 5,105,577 | 4/1992 | Hedges | 47/9 |
| 5,192,587 | 3/1993 | Rondy | 427/212 |
| 5,879,695 | 3/1999 | Bastiaansen et al. | 424/405 |
| 6,190,680 | * 2/2001 | Sakurada et al. | 424/401 |

* cited by examiner

*Primary Examiner*—Peter M. Poon
*Assistant Examiner*—Andrea M. Valente
(74) *Attorney, Agent, or Firm*—Flint & Kim, P.A.

(57) ABSTRACT

A landscaping dressing for application to spread mulch, pine needles, and similar natural fiber soil covering comprising a blend of linseed oil and soybean oil. The dressing will restore faded mulch and reduce fading of fresh mulch. Plant derived oils such as eucalyptus and neem oil may be included in the dressing.

12 Claims, No Drawings

LANDSCAPING DRESSING AND METHOD

FIELD OF THE INVENTION

This invention relates generally to a composition and method for enhancing, maintaining, and preserving the fresh appearance of wood fiber mulch, pine bark chips, and pine needles which are used for landscaping purposes.

BACKGROUND OF THE INVENTION

Landscaping mulch is usually made from wood chips, wood bark, sawdust or other wood and plant fibers. Mulch and pine needles are widely used in landscaping because each provides a soil covering, reduces erosion, keeps soil moist and in place, reduces the growth of weeds and undesirable vegetation, and tends to retain heat in the soil. In addition to these benefits which are derived from mulch, it is also used for its decorative effects by providing beds in which shrubbery, trees, and flowers can be aesthetically set apart from the grassy areas. Thus, not only because of its functional properties, mulch and pine needles are desirable from their ability to enhance the appearance of lawns, parks, and other areas.

Unfortunately, mulch made from wood chips and fibers will tend to weather and lose its original, rich and usually brown color when exposed to sunlight and rain. This deterioration in color can become noticeable after only a few months or less. Initially, by raking or turning the mulch the unexposed mulch below the surface can be brought to the surface to begin the aging cycle again but, this is a time consuming and labor intensive process and in a few months all of the mulch has been exposed so that a gray appearance results which is much less desirable from an aesthetic point of view. Accordingly, it is one object of the present invention to provide a method whereby re-raking or re-turning the mulch is not necessary.

When pine needles are used in landscaping and for beds they, too will fade, mat down, and tend to fade. In addition, debris such as leaves and twigs that fall onto pine needles has a tendency to mingle with the needles and cling to them thus lessening their aesthetic appeal. Accordingly, it is another object of the present invention to provide a method for retarding the deterioration of pine needles and to reduce the tendency of the needles to cling to debris.

One obvious solution to the aging and fading of mulch exposed to sunlight and water is to constantly replenish the mulch. However, this is a time consuming and expensive process which is merely a temporary solution. Accordingly, it is another object of the present invention to provide a dressing for wood fiber mulch which eliminates the need for constant replacement and re-spreading of the mulch.

In the past, a wide variety of dyes, paints, stains, and pigments have been employed to impart a pleasing color but many pigments and stains raise environmental concerns and the washout of dyes can pose a problem. In addition, dyes and pigments do have a tendency to "run" and can discolor adjacent walks or patios. The use of one such dye or coloring composition is disclosed in U.S. Pat. No. 4,932,156 which was granted on Jun. 12, 1990 to Roger Underwood. However, it is an object of the present invention to avoid the use of artificial or synthetic colorants and dyes in landscaping mulch and make use of natural or environmentally compatible coloring materials.

In one method of coloring wood mulch and avoiding dyes and pigments a mass of large fiber hardwood pulp is subjected to recycling of water through the wood fibers until they have reached a desired dark uniform color. This method is described in U.S. Pat. No. 4,788,790 which was granted on Dec. 6, 1988 to Charles Zeager. However, the recycling of water through chips or fibers until they darken appear to be a rather expensive and drawn out process. Accordingly, it is another object of the present invention to provide a method of making a dark uniformly colored mulch which avoids such extensive treatment of the mulch.

In another method for coloring wood chips which is described in U.S. Pat. No. 5,192,587 the wood chips are dyed in an aqueous solution of iron oxide and carbon black which appear to be natural or environmentally compatible materials but require the use of a solution in which to dye the wood chips. Again, it is an object of the present invention to avoid the use of a process of dying wood chips.

In still another approach, a blend of biodegradable thermoplastic polymers in naturally occurring biodegradable products is described in U.S. Pat. No. 3,932,319 which was granted on Jan. 13, 1976 to Robert Clendinning et al. This method requires the obtaining and blending of an additional material which would raise the cost of the mulch product. Thus, another object of the present invention is to avoid blending or additional handling of a mulch product.

In U.S. Pat. No. 5,105,577 to Hedges the incorporation of insecticides and odorants is described as a coating on the wood chips. However, insecticides and odorants incorporated as a coating will likely deteriorate with time and lose their effectiveness. Accordingly, it is yet another object of the present invention to provide a landscape dressing method which reduces the rate of loss of effectiveness of insecticides and fragrance enhancing additives.

In U.S. Pat. No. 5,879,695 which issued on Mar. 9, 1999 to Bastiaanae et al a ground covering material is described which is a weed inhibiting covering material comprising starches as a binder, a finely divided vegetable filler, and palm oil. The finely divided vegetable matter is preferably chaff and the starch is a potato starch mixed with palm oil. This mixture is more in the nature of a coating or paste to be applied in about 4 millimeters thickness. However, this covering material is particularly for agricultural soil and appearance is not an object nor is the use of a wood mulch and the enhancement of its appearance. Accordingly, it is another object of the present invention to incorporate vegetable oils as an applied spray to enhance the appearance of wood fiber based mulch.

The foregoing and objects are achieved by my invention which is described below in the Summary of the Invention and in the Detailed Description which follows.

SUMMARY OF THE INVENTION

The invention provides a mulch dressing and method for enhancing the appearance of mulch, pine needles and similar natural fiber landscaping materials retarding the fading of their color, and restoring the color after fading. It has been surprisingly discovered that a unique blend of vegetable oils accomplish this. Specifically, in one aspect, my discovery is a method of maintaining the appearance of wood fiber material mulch and pine needles which are used in landscaping comprising the steps of preparing a dressing or treating composition from a blend of plant derived oils, the major portion of said blend being a plant derived oil such as a triglyceride of a long chained fatty acid and a minor portion being an oil derived from soybean and then applying the dressing to mulch which has been spread. If the mulch has been freshly spread applying the dressing will extend its fresh, dark brown appearance. If the mulch has begun to fade or is dramatically faded the dressing can be applied by spraying and the appearance will become enhanced and continue in improved appearance. A preferred composition of the dressing is up to 95% of linseed oil with the balance being soybean oil.

The soybean oil is a natural emulsifying agent and will act as a flame retardant or suppressant. This is an especially important feature in mulch application where large mulch masses piled to depths of more than a few inches, e.g., greater than about six inches, because the decomposition of mulch generates heat that can result in spontaneous combustion.

Alternate to soybean oil within the scope of my invention are any of plant derived oils that will serve as emulsifiers with linseed oils.

Alternate to linseed oil within the scope of my invention are plant derived drying oils such as tung oil and oiticia oil.

It has also been surprisingly discovered that an especially useful blend comprises a major portion of linseed oil with about 5% to about 15% by weight of eucalyptus oil or means and the balance being up to 20% soybean oil. In minor portions, fungicides and insecticides may advantageously be incorporated in the blend as well as rodent and canine repellants. In addition, other fragrance promoters may beneficially be incorporated in the blend. Each of these ingredients work towards the presentation of a pleasing long term appearance of landscaped beds in residential and commercial lawns, parks, and other scenic areas.

DETAILED DESCRIPTION

For owners of landscape property whether it be a homeowner, an office complex park, a golf course, an institution, or a city, state, or federal park, once the investment in time and money has been made to plant lawns and install beds with shrubbery, trees, and flowers therein, the maintenance of the initial appearance is something that is highly desired. Wood fiber mulch prepared from shredded or ground or partially decomposed wood fiber is one of the more desirable ground coverings in beds and around borders of lawn areas to not only protect the root systems of the decorative foliage planted therein; but, keeping the mulch effective and attractive can be a problem. The same can be said for pine needles. Because of the high wood fiber content of mulch, the larger chips and shredded particles will tend to move to the top of the mulch area while the more finely ground or divided particles will wash or settle towards the ground or bottom of the area. The portion of the mulch which tends to settle out, unfortunately, is that portion which is responsible for the attractive dark brown color of the mulch. The larger pieces which remain on the surface tend to bleach out under the effects of sun and rain and turn into an undesirable grayish color. As mentioned previously, the mulch can be re-raked to bring the settled out material to the top or additional mulch can be added. Both of these are very time consuming, expensive, and a labor intensive task.

To maintain and/or restore the color in a manner which does not do any harm to the environment or surrounding plants and which is quick and easy to use, my invention provides a dressing comprising a mixture of a major portion of linseed oil with a minor portion of soybean oil which is applied to the mulch surface or to the surface of a pine needle bed. The linseed oil penetrates the wood fibers and chips or pine needles darkens and then improves their appearance. By doing this in the form of a spray either from a backpack pump or handheld pump or even sprinkled from a watering pot the color of the mulch can be immediately changed dramatically by simply walking across and dispensing the dressing over the desired areas. Application rates of approximately one gallon for 800 to 1200 square foot are usually adequate but depending upon the deterioration of the mulch and the number of the large wood chips on the surface, the amount of dressing required will vary. In severe cases, a second application may be necessary.

It has been found that not only does the dressing of the present invention revitalize and enhance the appearance, it also increases water retention in the mulch thus keeping the soil beneath moist for longer periods of time so that the roots of the plants in the treated beds are benefitted.

When applied to pine needle beds, the pine needles take on a rich, dark glossy appearance and tend to remain in place. Debris such as leaves and twigs which fall will not become easily entangled in the pine needles and can be readily blown off by a leaf blower without significantly disturbing the pine needle arrangement.

One of the problems with maintaining the appearance and effectiveness of many bedding areas is that rodents, rabbits, squirrels, and chipmunks will tend to burrow and disturb the area and dogs may dig in the beds. To overcome this problem capsicum is incorporated in the dressing of the present invention to discourage dogs and rodents. A preferred type of capsicum is hot pepper added in an effective amount.

Another problem encountered by those who own or maintain mulched landscaped areas is that mushrooms may grow in the landscaped area or undesirable fungus may penetrate and create undesirable colors or hardening and ineffectiveness of the mulch. Thus, a fungicide is desirably incorporated in the dressing and can be applied at the rate recommended by the manufacturer. The Ortho Division of the Solaris Group of Monsanto Chemical Company and the Spectrum Division of United Industries markets such fungicides and one will known brand names is "Daconil".

Also, ants, ticks, termites, and other undesirable insects may nest in the mulch. It has been found that by incorporating an insecticide in the mulch these can be eliminated.

Especially effective insecticides are those sold under the brand name of Spectracide®, Sevin®, or Malathion® sold by the above companies.

An especially useful oil to use instead of the above chemical pesticides and fungicide is neem oil which deters a wide variety of unwanted pests.

In order to both add to the color enhancement capabilities of the dressing and to act as an effective cover an undesirable odor may be caused by incorporation of the insecticide, fungicide, and rodent repellents mentioned above. To overcome this problem, it has been discovered that eucalyptus oil, added to the dressing in amounts from about 5% by weight to about 15% by weight, will effectively control odors. Eucalyptus oil also has the advantage that it naturally repels a wide variety of insect pests.

Mulch which is treated with the dressing with the specific ingredients described above has still another particular advantage not available in prior art mulches or dressings. It can be now used around foundations in contact with the walls of inhabited areas as it will not be a source for insects, fungus, rodents, and most importantly termites. Thus, greater flexibility in landscaping design is provided as well as protection to the homeowner.

Preferred compositions of the dressing are set forth in the examples below:

EXAMPLE 1

Pure linseed oil, a blend of 80% linseed oil and soybean oil, and a blend of 95% by weight of linseed oil distillate from Cargill, Inc. of Chicago, Ill. was blended with about 5% by weight of soybean also from Cargill, Inc. The color changed almost immediately as the dressing solution was absorbed and the mulch became a pleasing medium to dark brown color. The blends with the greater proportion of linseed oil tended to be darker in color.

After a period of 12 weeks, the mulch areas were judged on a hedonic scale of 1 to 10 with 1 being lightest and 10 darkest being the color of fresh mulch. The pure linseed oil and 95% blend tended to rate about 9, the 80/20 about 7, and the 50/50 about 6.

While pure linseed oil shows desirable characteristics it is not preferred because in some instances if mulch with a heavy dressing of linseed were raked into a deep pile and left for a period of time, spontaneous combustion might occur. It has been found that at least about 5% by weight of soybean oil will act as a fire retardant and thus this blend proportion is preferred.

EXAMPLE 2

A dressing composition of 85% by weight of linseed oil, 10% by weight of eucalyptus oil and 5% soybean oil was mixed. The eucalyptus oil is known as eucalyptus globulus labille oil was prepared. Because of this high proportion of linseed oil this blend will keep the mulch dark and rich and the significant portion of eucalyptus oil will mask the often unpleasant order of landfill mulch and provide insect repellency.

Thus, the preferred embodiments of my invention are a dressing of 95% linseed oil and 5% soybean oil and a dressing of 85% linseed oil, 10% eucalyptus oil, and about 5% soybean oil.

The ranges which are preferred are about 80% to 95% linseed oil with about 20% to about 5% soybean oil.

For the preferred ranges using eucalyptus oil, the blends are about 80% to 90% linseed oil, and about 5% to about 10%, about 5% to about 10% soybean oil.

The above oils tend to be co-solvents and/or emulsifiers solvency promoters that are well known to those skilled in the art such as amine soaps or salts or isopropyl alcohol may be included in minor amounts as necessary.

While the above described invention has been described in connection with specific compositions, it is clearly understood that the description is made only by way of explanation and not limitation. The invention is only limited by the claims that follow.

What is claimed is:

1. A method for enhancing and maintaining the appearance of wood fiber mulch and pine needles used in landscaping comprising the steps of:
    a) preparing a dressing composition comprising a blend of a plant derived oils, the major portion of said blend being a first oil that is a triglycerides of long chain fatty acids and a minor portion of said blend being a second oil which is plant derived oil that is an emulsifying agent in the first oil;
    b) spreading said mulch, or pine needles in a landscaping arrangement; and,
    c) applying said dressing to said mulch or pine needles.

2. The method of claim 1 wherein said mulch or pine needles are faded.

3. The method of claim 1 wherein said first oil of said major portion comprises an oil selected from the group consisting of plant derived drying oils.

4. The method of claim 1 wherein said first oil of the major portion of oil comprises linseed oil up to about 95% by weight of said dressing and the second oil comprises soybean oil.

5. The method of claim 1 wherein said dressing comprises a major portion of linseed oil, about 5% to about 15% by weight of eucalyptus oil; and the remainder being up to about 10% to about 5% soybean oil.

6. The method of claim 1 wherein further minor ingredients of said dressing are selected from the group consisting of rodent repellants, fungicides, dog repellants, fragrance promoters, and insecticides.

7. A landscaping mulch dressing composition for enhancing, preserving, and restoring the appearance of fresh or aged wood fiber mulch or pine needles comprising:
    a) a major portion of a vegetable oils selected from the group consisting of plant derived dry oils.
    b) a first minor portion of soybean oil; and,
    c) a second minor portion comprising eucalyptus oil.

8. The dressing composition of claim 7 including:
    a) a major portion of linseed oil;
    b) a first minor portion of about 5% to about 15% by weight of eucalyptus oil; and,
    c) a second minor portion selected from the group consisting of fragrance enhancers, insecticides, rodent and dog repellants, and fungicides.

9. A landscaping dressing for mulch, pine needles, and like natural fiber based soil coverings comprising a blend consisting essentially of:
    a) about 80% to about 90% by weight of linseed oil;
    b) about 5% to about 15% by weight of eucalyptus oil; and,
    c) about 5% to about 10% by weight of soybean oil.

10. The dressing of claim 9 wherein neem oil is substituted for said eucalyptus.

11. A method for enhancing and maintaining the appearance of wood fiber mulch and pine needles used in landscaping comprising the steps of:
    a) preparing a dressing composition comprising a blend of a major portion of lindessed oil, 5–15% by weight eucalyptus oil, the remainder comprising about 10% to 5% soybean oil,
    b) applying said dressing to said mulch or pine needles.

12. The method of claim 11 wherein the further minor ingredients of said dressing are selected from the group consisting of rodent repellants, fungicides, dog repellants, fragrance promoters, and insecticides.

* * * * *